(12) United States Patent
Kakinoki (10) Patent No.: US 6,266,720 B1
(45) Date of Patent: Jul. 24, 2001

(54) CIRCUIT CARD CAPABLE OF SWITCHING BETWEEN AT LEAST AN N-BIT MODE OF OPERATION AND AN M-BIT MODE OF OPERATION

(75) Inventor: Wataru Kakinoki, Yokohama (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/199,995

(22) Filed: Nov. 24, 1998

(30) Foreign Application Priority Data

Nov. 27, 1997 (JP) .................................................. 9-342150

(51) Int. Cl.⁷ ...................................................... G06F 13/14
(52) U.S. Cl. ............................ 710/63; 710/105; 348/222; 348/232
(58) Field of Search ...................... 710/63, 105; 348/222, 348/232

(56) References Cited

U.S. PATENT DOCUMENTS

| | | | |
|---|---|---|---|
| 5,627,416 | 5/1997 | Kantner | 307/119 |
| 5,708,799 * | 1/1998 | Gafken et al. | 326/37 |
| 5,911,050 * | 6/1999 | Egan et al. | 361/58 |
| 5,918,202 * | 6/1999 | Kuroki et al. | 702/189 |
| 6,088,746 * | 7/2000 | Koppa | 710/63 |

FOREIGN PATENT DOCUMENTS

| | | |
|---|---|---|
| 0362050 | 4/1990 | (EP) . |
| 08166906 | 6/1996 | (JP) . |
| WO9614689 | 5/1996 | (WO) . |

* cited by examiner

Primary Examiner—Thomas Lee
Assistant Examiner—Abdelmoniem Elamin
(74) Attorney, Agent, or Firm—Ostrolenk, Faber, Gerb & Soffen, LLP (57) ABSTRACT

A PC card includes a circuit having a first function, a circuit having a second function, a selector for selecting either the first or second function, and a slot-type identification mechanism for identifying the type of PC card slot. The selector selects either the first or second function according to an identification signal received from the slot-type identification mechanism. Upon insertion into a PC card slot, the PC card self-identifies an operation mode.

10 Claims, 8 Drawing Sheets

FIG. 10

CIRCUIT CARD CAPABLE OF SWITCHING BETWEEN AT LEAST AN N-BIT MODE OF OPERATION AND AN M-BIT MODE OF OPERATION

CROSS-REFERENCE TO RELATED APPLICATIONS

This application is related to copending application Ser. No. 09/198,898, entitle PC CARD SWITCHABLY COMPATIBLE WITH 16-BIT AND 32-BIT MODES, filed Nov. 24, 1998, the entire disclosure of which is incorporated herein by reference.

BACKGROUND OF THE INVENTION

1. Field of the Invention

The present invention relates to a PC card capable of being plugged into a computer system, where the PC card is capable of switching between a 16-bit operation mode and a 32-bit operation mode. More particularly, the invention relates to a PC card capable of automatically switching operation modes upon being plugged into a card slot of a computer system.

2. Description of the Related Art

A PC card is a peripheral device developed for expanding capabilities of a personal computer (PC). PCMCIA (Personal Computer Memory Card Interface Association) and JEIDA (Japan Electronic Industry Development Association) have taken the initiative in prescribing mechanical and electrical specifications of PC cards. These specifications are hereby incorporated by reference. At present various kinds of PC cards are on the market, including memory cards, flash memory cards, HDD cards, and FAX/MODEM cards.

These PC cards are classified into 8-bit PC cards, 16-bit PC cards, and 32-bit PC cards, according to the width of an internal data bus. Currently marketed PCs have PC card slots provided therein for accepting various types of PC cards. However, PC card slots formed in some conventional PCs accept only a 16-bit PC card and a 32-bit PC card cannot be inserted into such a slot.

According to the above-mentioned specifications, a projection is provided in the vicinity of a PC card slot in order to identify the type of a PC card to be inserted into the slot. In this connection, a PC card has a groove formed therein in the vicinity of a connector thereof in order to receive the projection. The groove is sufficiently deep to accept the projection. The specifications dictate that a projection provided in a PC card slot dedicated to a 16-bit PC card be higher than that provided in a PC card slot dedicated to a 32-bit PC card. Accordingly, when a user attempts to insert a 32-bit PC card into a PC card slot dedicated to a 16-bit PC card, a projection provided in the slot prevents the insertion because the corresponding groove formed in the 32-bit PC card is too shallow to receive the projection. Since a drive voltage for a 32-bit PC card is 3.3 V, whereas that for a 16-bit PC card is 5 V, such a structural feature is appropriate for protecting an internal circuit of a card.

As the functions of PCs improve, the bus width of a PC card generally shifts from 8 bits to 16 bits and 32 bits. Currently released PC cards are most commonly of the 32 bit variety. However, many users still use PCs having a PC card slot dedicated to only a 16-bit PC card. According, if newly manufactured PC cards are adapted to operate in both 32-bit and 16-bit operation modes, they will be accepted by many more users.

However, because of the above-mentioned specifications, a 32-bit PC card cannot be inserted into a slot dedicated to a 16-bit PC card. Even when a groove formed in a 32-bit PC card is made deeper so that the 32-bit PC card can be inserted into a 16-bit PC card slot, neither the 32-bit PC card nor the associated PC can identify the 32-bit PC operation mode; thus, the 32-bit PC card cannot be operated properly.

SUMMARY OF THE INVENTION

In view of the foregoing, an object of the present invention is to provide a PC card which can select from among a plurality of operation modes associated with a plurality of data bus widths and which, when inserted into a PC card slot, can identify the type of the PC card slot and select the operation mode accordingly.

To achieve the above object, the present invention provides a PC card comprising: a circuit having a first function; a circuit having a second function; a selector for selecting either the first or second function; and a slot-type identification unit for identifying the type of PC card slot. The selector selects either the first or second function according to an identification signal received from the slot-type identification unit.

A typical PC card according to the present invention includes: a logic circuit which operates in a 16-bit mode; a logic circuit which operates in a 32-bit mode; a microprocessor; a microswitch provided on the PC card which, when inserted into a PC card slot, operates according to the shape of the PC card slot; and a signal line for transmitting an output from the microswitch to the microprocessor.

The shape of the PC card slot is a function of the width in bits of the card slot. Accordingly, when the PC card is inserted into the PC card slot, the make-break state of the microswitch changes depending on the shape of the PC card slot. The microprocessor identifies the state of the microswitch and switches the internal operation modes of the PC card accordingly. Thus, upon insertion of the PC card into the PC card slot, operation mode selection is completed within the PC card. Therefore, a user does not need to check for the type of PC card slot or to switch operation modes of a PC card.

BRIEF DESCRIPTION OF THE DRAWINGS

Other objects, features, and advantages of the present invention will become clear by reference to the following description of embodiments together with the accompanying drawings which.

DESCRIPTION OF EMBODIMENTS OF THE INVENTION

Embodiments of the present invention will next be described in detail with reference to the drawings.

Figure 1:
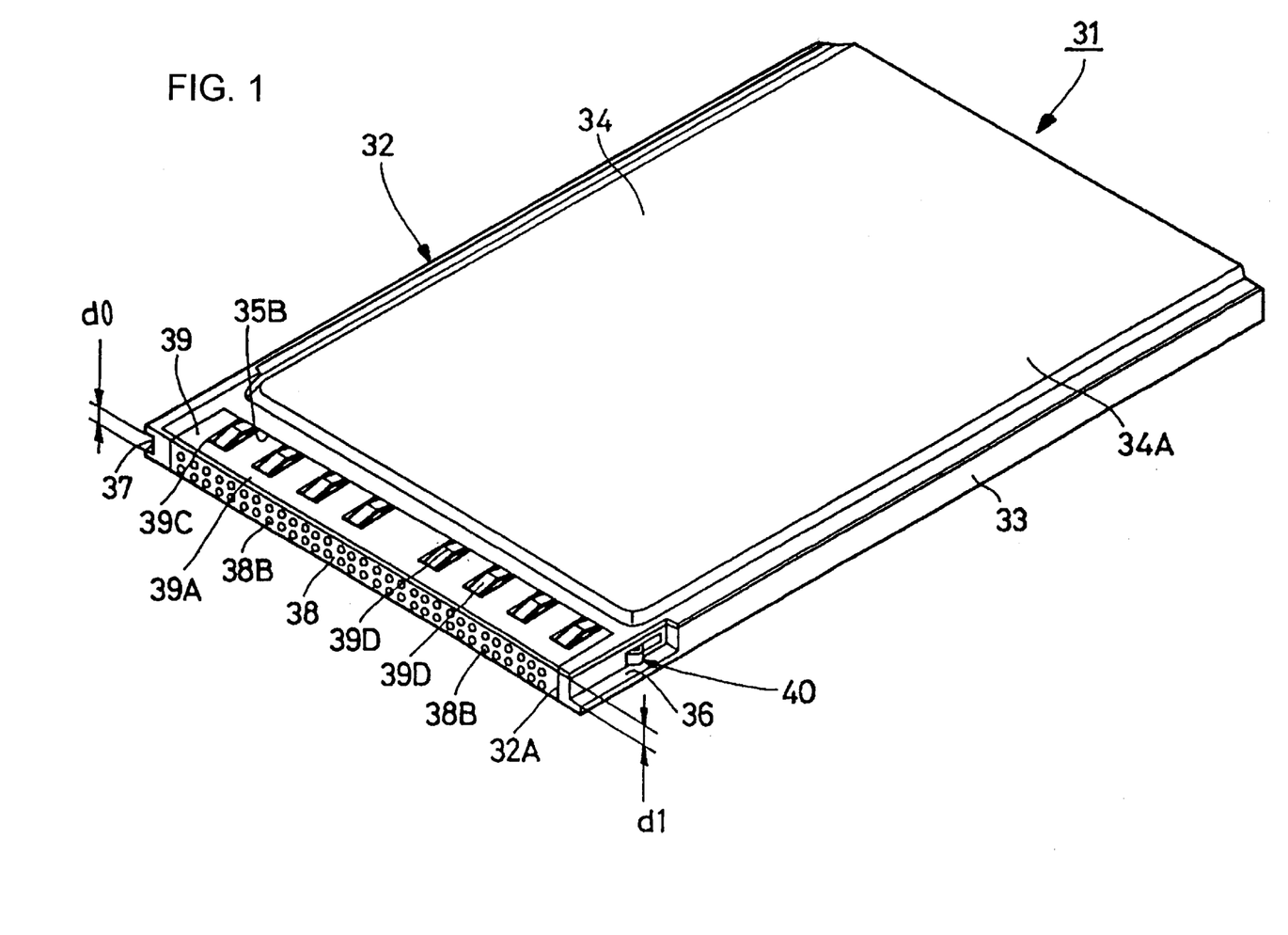
FIG. 1 is a perspective view of a PC card according to a first embodiment of the present invention.

FIG. 1 shows a perspective view of a PC card according to a first embodiment of the present invention. In FIG. 1, numeral 31 denotes a PC card according to the first embodiment, and numeral 32 denotes a casing of the PC card 31. The casing 32 has a thin plate shape and is composed of a thin frame 33 and two panels 34. The frame 33 is substantially U-shaped and opens in upward and downward directions as viewed in FIG. 1. The panels 34 each have a rectangular expanded portion 34A and define a board space 35 located therebetween. A board to be accommodated within the space 35 carries an electronic circuit, which will be described later, that operates in either a 16-bit mode or a 32-bit mode, depending on which mode is selected.

One end of the casing 32 opens to form an attachment opening 32A. A connector 38 is disposed in the attachment opening 32A. The upper panel 34 of FIG. 1 is partially cut off such that the top face of the connector 38 is exposed as shown in FIG. 1.

A groove 36 is formed in the frame 33 in the vicinity of the connector 38. A depth d1 of the groove 36 is substantially identical to the depth of a groove which is formed in a 16-bit PC card according to PCMCIA specifications.

Numeral 37 denotes a guide groove that is formed in the right-hand wall of the frame 33 as viewed in the direction of insertion of the PC card 31 and is located in the vicinity of the attachment opening 32A. A width d0 of the guide groove 37 is substantially identical to the width of a guide groove formed in a 32-bit PC card.

Figure 5:
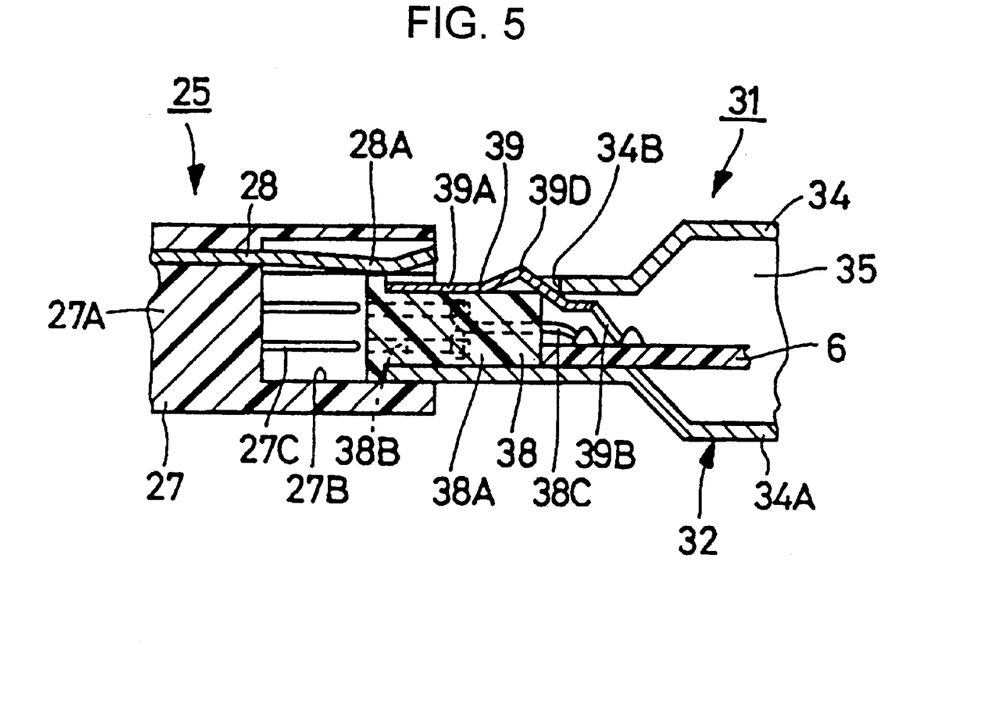
FIG. 5 is a sectional view showing a state as observed before the PC card of the first embodiment is inserted into the 32-bit PC card slot.
Figure 7:
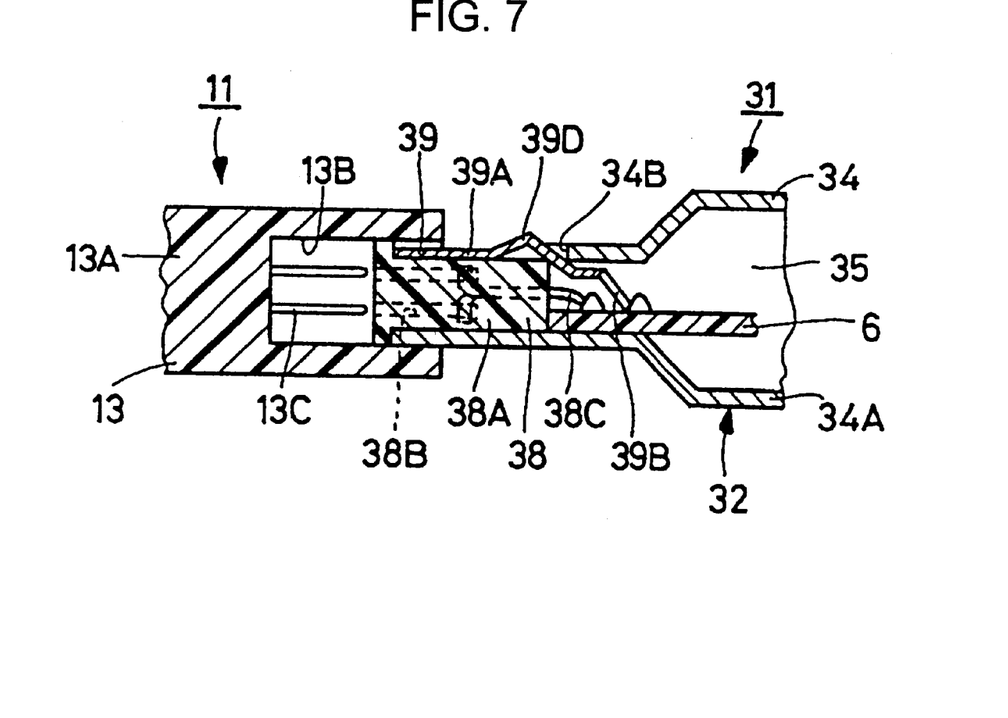
FIG. 7 is a sectional view showing a state as observed before the PC card of the first embodiment is inserted into the 16-bit PC card slot.

Numeral 38 denotes an elongated connector provided in the attachment opening 32A of the casing 32. As shown in FIGS. 5 and 7, the connector 38 of the PC card 31 is composed of a rectangular block 38A, pin holes 38B, and terminal pins 38C. The rectangular block 38A is made of a resin material and elongated. The pin holes 38B are formed in the rectangular block 38A in such a manner as to extend from the front face of the rectangular block 38A (FIG. 5) toward the rear face of the rectangular block 38A and arranged in two rows by thirty-four columns (FIG. 1), i.e., there are sixty-eight pin holes 38B in total. Base ends of the terminal pins 38C are located at bottom end portions of the pin holes 38B. Tip end portions of the terminal pins 38C are projected from the rear face of the rectangular block 38A such that tip ends of the terminal pins 38C are connected to a circuit board 6.

Numeral 39 denotes a grounding electrode disposed on the top surface of the connector 38 of FIG. 1. The grounding electrode 39 is formed of a conductive metallic sheet and is composed of a flat electrode sheet 39A, a plurality of grounding terminals 39B (for example, eight), a plurality of cut portions 39C, and a plurality of spring projections 39D. The electrode sheet 39A is bonded onto the top face of the rectangular block 38A of FIG. 1. The grounding terminals 39B extend from the electrode sheet 39A to a grounding portion of the circuit board 6. The cut portions 39C are formed in the electrode sheet 39A to be located between the grounding terminals 39B and extend from the rear end of the electrode sheet 39A toward the front end of the electrode sheet 39A as viewed in the direction of insertion of the PC card 31. Each of the spring projections 39D is located between the corresponding cut portions 39C and formed of a bent tongue piece extending from the electrode sheet 39A in the opposite direction of insertion of the PC card 31. The spring projections 39D replace the projections 24C used in the conventional PC card and effect elasticity when inserted into a connector 13 of a PC card slot.

Figure 2:
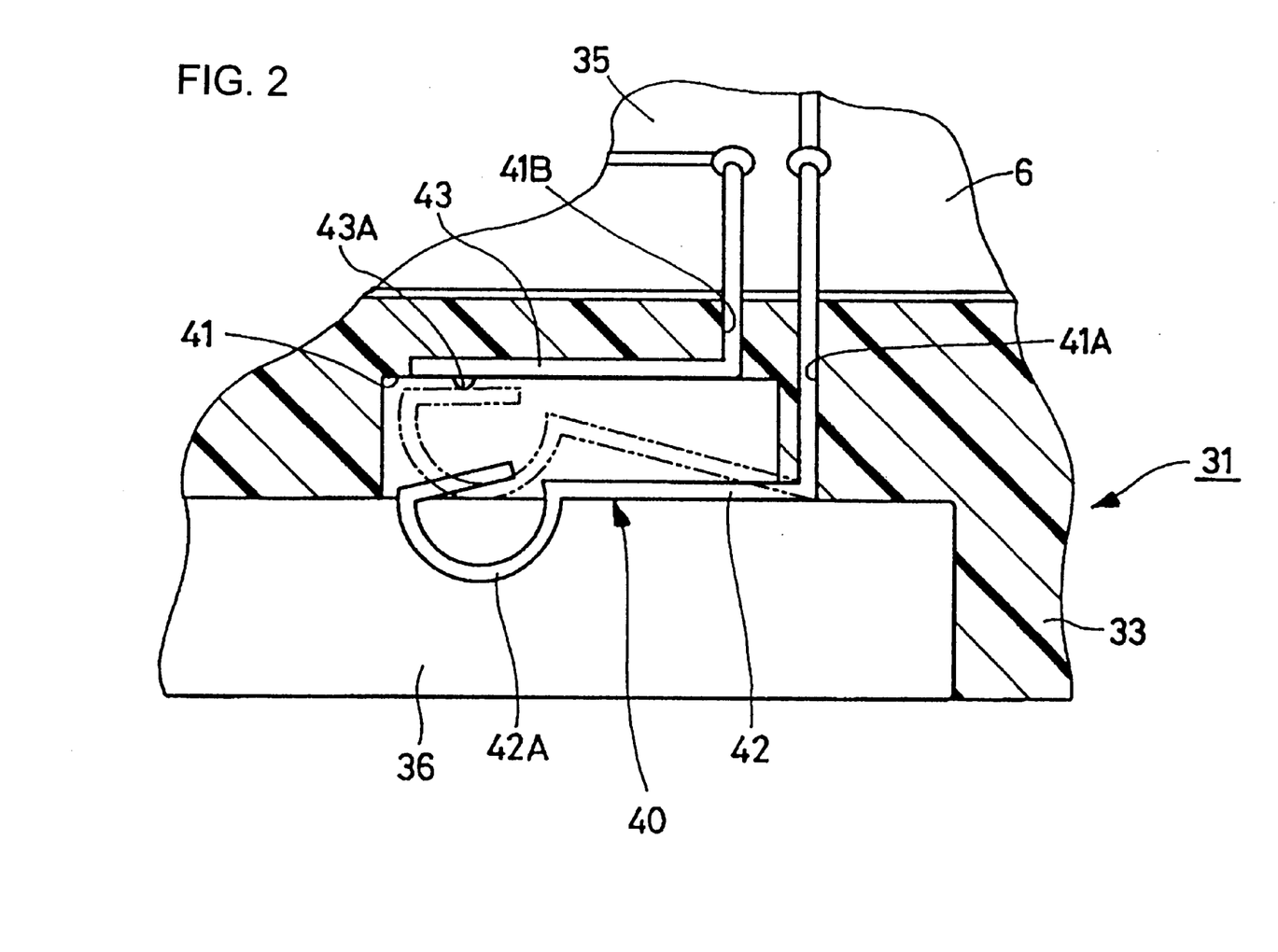
FIG. 2 is a longitudinal sectional view showing an identification switch of the PC card of the first embodiment and peripheral structure of the switch.

Numeral 40 denotes an identification switch located in the vicinity of the groove 36. As shown in FIG. 2, the identification switch 40 is composed of a switch accommodation hole 41, a movable contact 42 accommodated within the switch accommodation hole 41, and a stationary contact 43. The contacts 42 and 43 are each formed by bending a rectangular plate.

The switch accommodation hole 41 is formed in the left-hand side wall of the frame 33 as viewed in the direction of insertion of the PC card 31 such that the switch accommodation hole 41 is opened onto the vertical wall of the groove 36. A through-hole 41A is formed in the frame 33 in the vicinity of the right-hand end of the switch accommodation hole 41 of FIG. 2 in such a manner as to extend to the board accommodation space 35. A through-hole 41B is formed at the bottom of the switch accommodation hole 41 in such a manner as to extend to the board accommodation space 35.

The movable contact 42 is formed of a plate material. The base end portion of the movable contact 42 is passed through the through-hole 41A and is soldered onto the circuit board 6. The movable contact 42 is bent at an angle of 90 degrees at an intermediate position thereof so as to extend in the longitudinal direction of the groove 36. The tip end portion of the movable contact 42 is curved to form a movable portion 42A having a semicircular cylindrical shape. When the movable portion 42A is pressed from outside the frame 33, the movable contact 42 moves to a position represented by a phantom line of FIG. 2 to come into contact with the stationary contact 43.

The stationary contact 43 is formed of a plate material. The base end portion of the stationary contact 43 is passed through the through-hole 41B and is soldered onto the circuit board 6. The stationary contact 43 is bent at an angle of 90 degrees at an intermediate position thereof so as to extend along the bottom of the switch accommodation hole 41 in the longitudinal direction of the groove 36. A stationary portion 43A projects from a tip end portion of the stationary contact 43.

Figure 3:
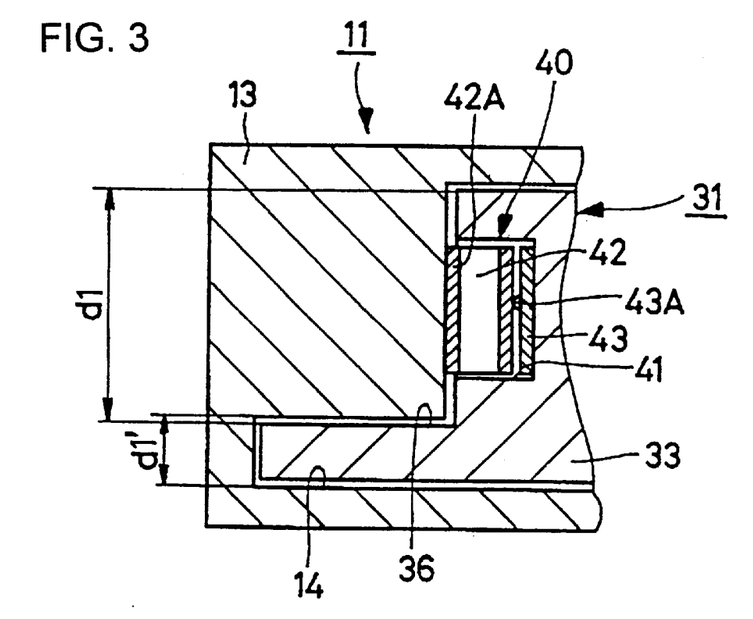
FIG. 3 is a partially enlarged sectional view showing the PC card of the first embodiment inserted into a 16-bit PC card slot.

The identification switch 40 having the above-described structure is closed when the PC card 31 is inserted into a 16-bit PC card slot 11. Specifically, as shown in FIG. 3, when the PC card 31 is inserted into the connector 13 of the PC card slot 11, the side wall of the card-side groove 36 is guided by the side wall of a slot-side groove 14 and no gap is formed therebetween. The side wall of the groove 14 presses the movable portion 42A, so that the movable portion 42A comes into contact with the stationary portion 43A, thereby closing the identification switch 40.

Figure 4:
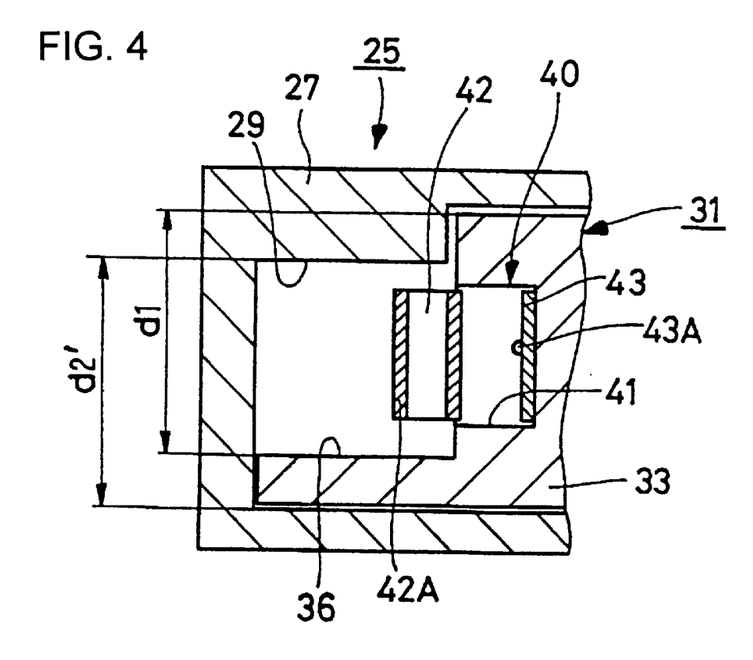
FIG. 4 is a partially enlarged sectional view showing the PC card of the first embodiment inserted into a 32-bit PC card slot.

The identification switch 40 is opened when the PC card 31 is inserted into a 32-bit PC card slot 25. Specifically, as shown in FIG. 4, when the PC card 31 is inserted into a connector 27 of the PC card slot 25, a gap is formed between the side wall of the card-side groove 36 and the side-wall of a slot-side groove 29. Since the movable portion 42A is located within the gap, i.e., the movable portion 42A does not come into contact with the side wall of the groove 29, the identification switch 40 is opened.

Thus, when the PC card 31 is inserted into the 16-bit PC card slot 11, the identification switch 40 outputs a closing signal. When the PC card 31 is inserted into the 32-bit PC card slot 25, the identification switch 40 outputs an opening signal.

When the PC card 31 is inserted into the 32-bit PC card slot 25, i.e., when the connector 38 of the PC card 31 is inserted into the connector 27 of the PC card slot 25, the side wall of the card-side groove 36 is guided by the slot-side groove 29, while the groove 37 is guided by a guide projection 30.

Figure 6:
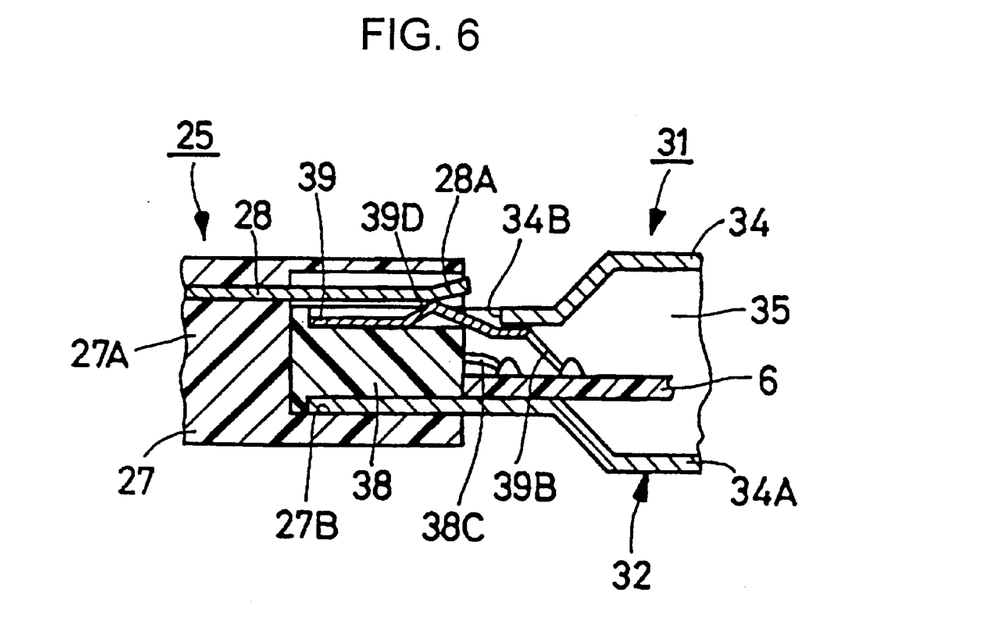
FIG. 6 is a sectional view showing a state as observed after the PC card of the first embodiment is inserted into the 32-bit PC card slot.

As shown in FIG. 6, the spring projection 39D of the grounding electrode 39 comes into contact with a contact piece 28A of a receiving grounding electrode 28 of the 32-bit PC card slot 25. When the PC card 31 is inserted into the 32-bit PC card slot 25, the identification switch 40 is opened as shown in FIG. 4.

The insertion of the PC card 31 into the 16-bit PC card slot 11 as shown in FIG. 7 will now be described. When the PC card 31 is inserted into the connector 13 of the 16-bit PC card slot 11, the side wall of the card-side groove 36 is guided by the slot-side groove 14 (FIG. 3), while the groove 37 is guided by a guide projection 15.

Figure 8:
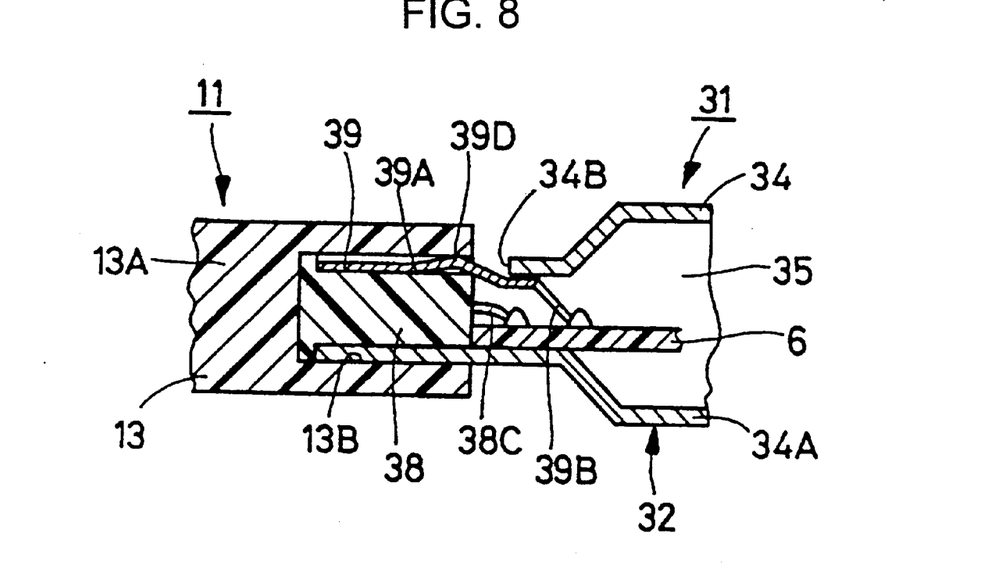
FIG. 8 is a sectional view showing a state as observed after the PC card of the first embodiment is inserted into the 16-bit PC card slot.

Further, as shown in FIG. 8, since the connector insertion hole 13B causes the spring projection 39D of the grounding electrode 39 to be deflected, the PC card 31 can be inserted into the 16-bit PC card slot 11.

Since the PC card 31 has the identification switch 40 located in the vicinity of the groove 36, the insertion of the PC card 31 into the 16-bit PC card slot 11 causes the movable portion 42A of the identification switch 40 to be pressed by the side wall of the groove 14 (FIG. 3) of the 16-bit PC card slot 11. As a result, the movable portion 42A is bent toward the stationary contact 43, thereby establishing the contact between the contacts 42 and 43. Thus, the identification switch 40 outputs a signal for identifying the PC card slot as a 16-bit PC card slot 11.

When the PC card 31 is inserted into the 32-bit PC card slot 25, the movable portion 42A of the identification switch 40 is apart from the side wall of the groove 29 of the PC card slot 25. As a result, the identification switch 40 is opened.

Thus, the PC card 31 can identify the type of PC card slot, 16 bits or 32 bits, into which the PC card 31 is inserted, based on a signal which the identification switch 40 issues. Further, the PC card 31 can automatically switch the driving voltage for the circuits on the circuit board 6 from between 5.0 V and 3.3 V by insertion of the PC card 31 into a PC card slot, rather than by manual operation by a user.

Figure 9:
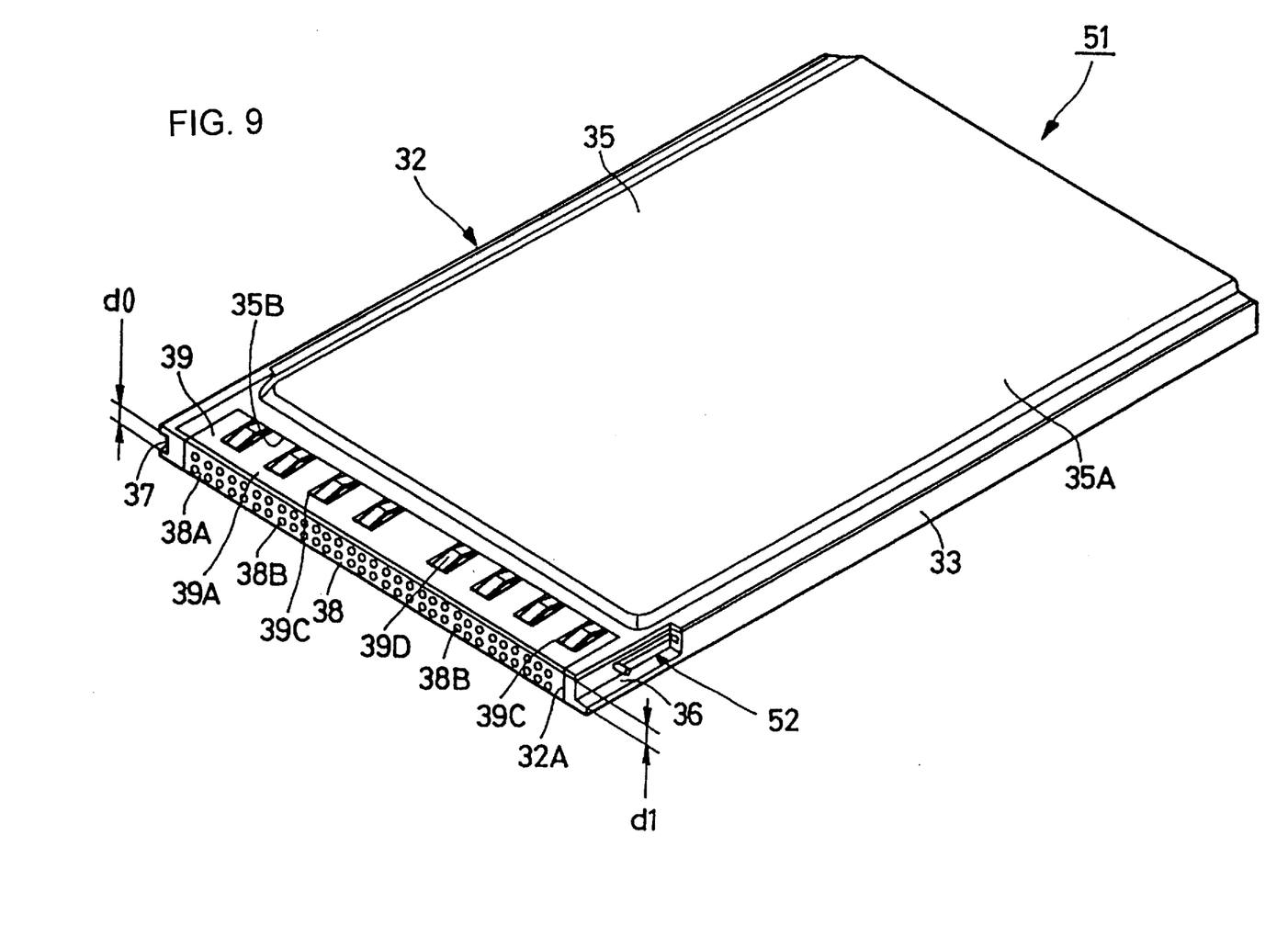
FIG. 9 is a perspective view of a PC card according to a second embodiment of the present invention.
Figure 10:
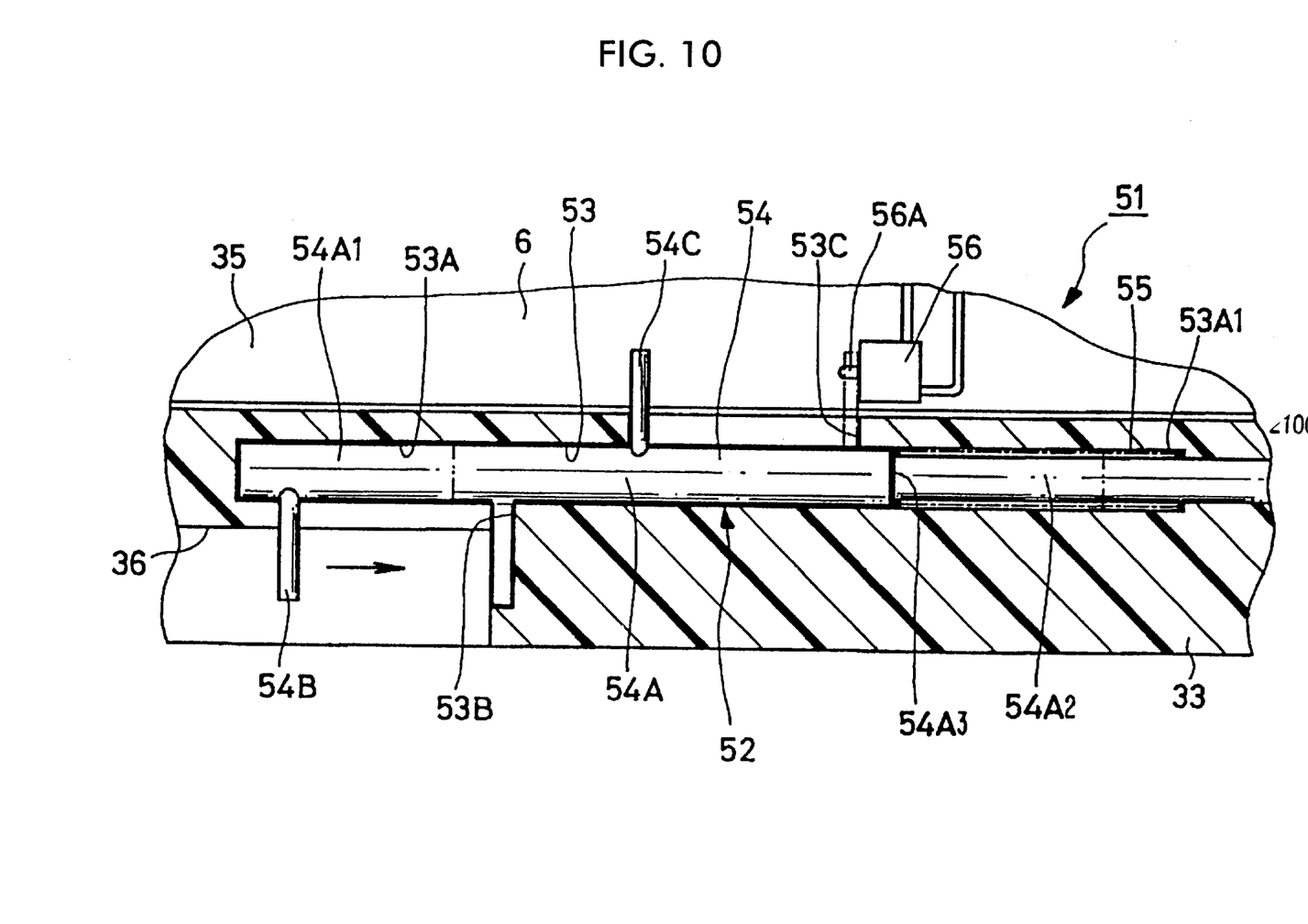
FIG. 10 is a longitudinal sectional view showing an identification switch of the PC card of the second embodiment and a peripheral structure of the switch.

A second embodiment of the present invention will now be described with reference to FIGS. 9 and 10. According to the second embodiment, an identification switch is composed of a movable rod and a switch element. The movable rod moves in the direction of insertion of the PC card when the PC card is inserted into a PC card slot. The switch element is adapted to detect the movement of the movable rod. In the following description of the second embodiment, the same features as those of the first embodiment are denoted by common reference numerals, and their description is omitted.

Numeral 51 denotes a PC card according to the second embodiment. The PC card 51 is configured in a manner similar to that of the PC card 31 of the first embodiment except that an identification switch 52, which will be described later, is used in place of the identification switch 40.

The identification switch 52 is located in the vicinity of the groove 36. As shown in FIG. 10, the identification switch 52 is composed of an elongated rod accommodation hole 53, a movable rod 54, a spring 55, and a switch element 56. The rod accommodation hole 53 extends in the longitudinal direction of the frame 33. The movable rod 54 is slidably accommodated in a rod-sliding hole 53A of the rod accommodation hole 53. The spring 55 urges portions of the movable rod 54 away from the switch element 56. The switch element 56 is mounted on the circuit board 6 and is closed and opened through movement of the movable rod 54.

The rod accommodation hole 53 extends in the longitudinal direction of the frame 33 and is composed of the rod-sliding hole 53A, an elongated external opening 53B, and an elongated internal opening 53C. The rod-sliding hole 53A is an elongated hole having a spring bearing portion 53A1. The external opening 53B is located near the left-hand end of the rod-sliding hole 53A of FIG. 10 and opens onto the groove 36. The internal opening 53C is located at an intermediate position of the rod-sliding hole 53A and opens onto the board accommodation space 35.

The movable rod 54 is movably accommodated in the rod-sliding hole 53A of the rod accommodation hole 53 and is composed of a rod 54A, a rod-like moving portion 54B, and a rod-like pushing portion 54C. The rod 54A includes a large-diameter portion 54A1, a small-diameter portion 54A2, and a spring bearing portion 54A3. The moving portion 54B is located near the left-hand end of the rod 54A of FIG. 10 and extends from the rod 54A into the groove 36 perpendicularly to the rod 54A. The pushing portion 54C is located at an intermediate position of the rod 54A and extends from the rod 54A into the board accommodation space 35 through the internal opening 53C perpendicularly to the rod 54A such that it is located above the circuit board 6.

The spring 55 is accommodated in the rod accommodation hole 53 and is disposed between the spring bearing portion 53A1 and the spring bearing portion 54A3. The spring 55 urges the pushing portion 54C away from the switch element 56.

The switch element 56 is fixed to the circuit board 6 through soldering and has a push button 56A. When the push button 56A is pressed, the switch element 56 outputs a closing signal.

As in the case of the identification switch 40 of the first embodiment, the identification switch 52 is closed when the PC card 51 is inserted into the 16-bit PC card slot 11. Specifically, when the PC card 51 is inserted into the PC card slot 11, the side wall of the card-side groove 36 is guided by the side wall of the slot-side groove 14. At the same time, the moving portion 54B (movable rod 54) of the identification switch 52 comes into contact with an end surface of the connector 13 in the vicinity of the groove 14 and moves in the direction of the arrow in FIG. 10. As a result, the movable rod 54 is shifted to the position represented by the phantom line of FIG. 10. The pushing portion 54C of the movable rod 54 moves accordingly, thereby pressing the push button 56A of the switch element 56. The switch element 56 outputs a closing signal, whereby the PC card 51 can identify the PC card slot as the 16-bit PC card slot 11.

As in the case of the identification switch 40 of the first embodiment, when the PC card 51 is inserted into the 32-bit PC card slot 25, the moving portion 54B of the movable rod 54 is located within the gap formed between the side wall of the card-side groove 36 and the side wall of the slot-side groove 29. Thus, the identification switch 52 is opened.

Thus, the identification switch 52 enables the PC card 51 of the second embodiment to identify the PC card slot into which it is inserted as a 16-bit PC card slot (requiring a driving voltage of 5.0 V) or a 32-bit PC card slot (requiring a driving voltage of 3.3 V).

In the above embodiments, the identification switch 40 (52) is closed when the PC card 31 (51) is inserted into the 16-bit PC card slot 11. However, the present invention is not limited thereto. The identification switch 40 (52) may be configured so as to be opened when the PC card 31 (51) is inserted into the 16-bit card slot 11 and to be closed when the PC card 31 (51) is inserted into the 32-bit PC card slot 25.

Other types of switching device may be used as well.

Figure 11:
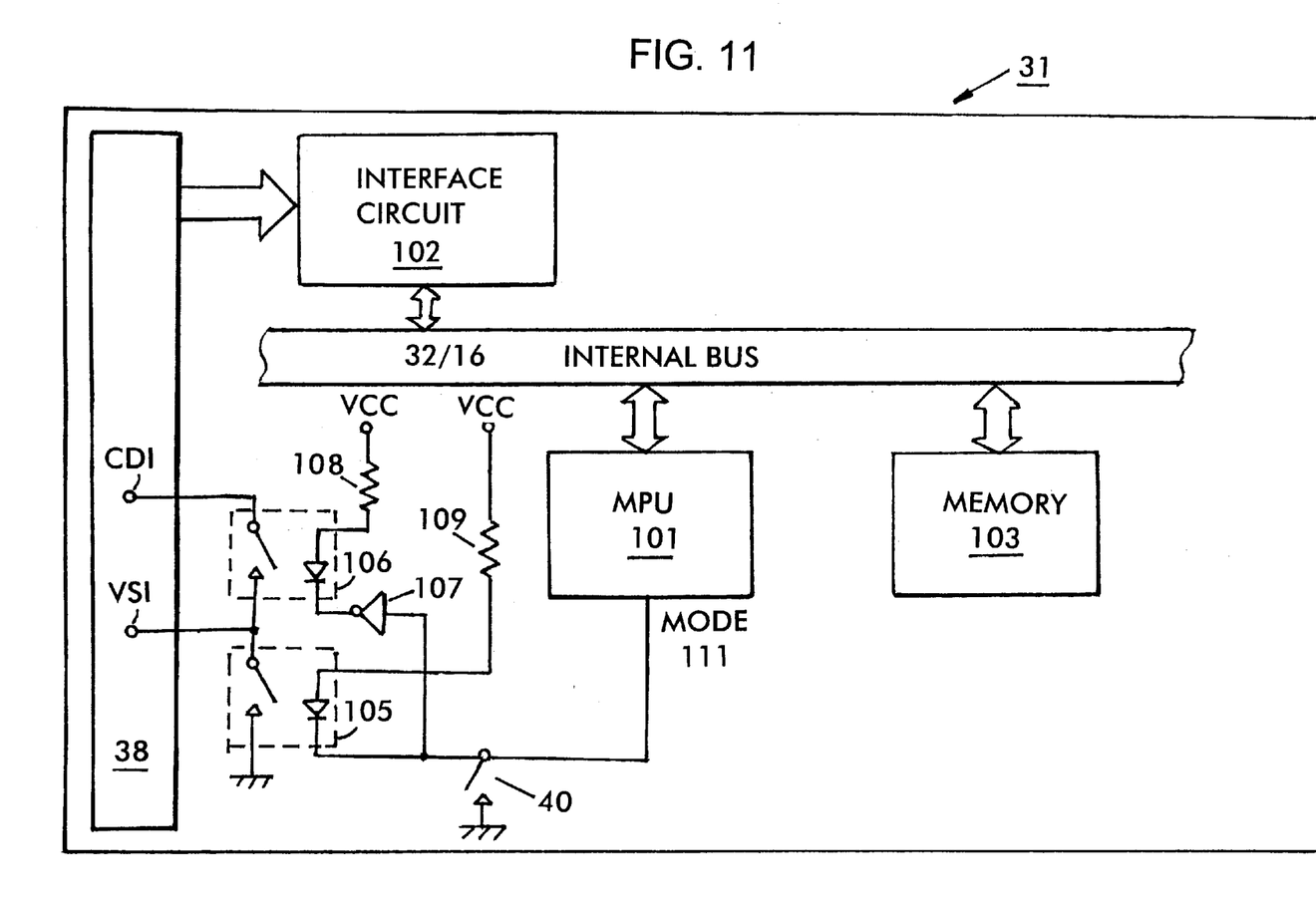
FIG. 11 is a schematic block diagram showing the internal hardware configuration of the PC card of the first embodiment.

FIG. 11 is a schematic block diagram showing the internal hardware configuration of the PC card 31.

An MPU 101 switches an operation mode between a 32-bit mode and a 16-bit mode according to a state of the MODE signal 111. The MPU 101 may read from a memory 103 a program corresponding to a currently active mode and execute the program. An internal bus is used either as a 32-bit bus or as a 16-bit bus according to an operation mode of the MPU 101. The internal bus is connected to the connector 38 via an interface circuit 102. The connector 38 may be a 68-pin connector, but is not limited thereto.

One end of the switch 40 is preferably grounded. The other end of the switch 40 is preferably connected to a MODE terminal 111, to a first terminal of a relay 105, and to a first terminal of a relay 106 via an inverter 107.

Second terminals of the relays 105 and 106 are connected to Vcc via resistors 108 and 109, respectively. A third terminal of the relay 105 is grounded, while a fourth terminal of the relay 105 is connected to a third terminal of the relay 106 and to a VS1 terminal of the connector 38. A fourth terminal of the relay 106 is connected to a CD1 terminal of the connector 38.

When the switch 40 is closed, the relay 105 goes ON, and the VS1 terminal is grounded. The relay 106 goes OFF, and the CD1 terminal is opened. The PC into which the PC card 31 is inserted recognizes these terminal conditions as indicating that the PC card 31 operates in the 16-bit mode. Further, since the MODE terminal is grounded, the MPU 101 switches an operation mode to the 16-bit mode.

When the switch 40 is opened, the relay 105 goes OFF, and the relay 106 goes ON, thereby establishing a connection between the CD1 terminal and the VS1 terminal. Thus, the PC recognizes that the PC card 31 operates in the 32-bit mode. Further, since the voltage of the MODE terminal becomes identical to Vcc, the MPU 111 switches an operation mode to the 32-bit mode.

As described above, as soon as the PC card 31 is inserted into a PC card slot, operation modes are switched within the PC card 31, and the PC recognizes an operation mode of the PC card 31.

In the above embodiments the PC card functions corresponding to 16-bit and 32-bit operation modes. However the present invention is also applicable to a PC card having a combination of other types of functions. Also, the present invention is not limited to the internal hardware configuration of a PC card as shown FIG. 11, but-may employ any internal hardware configuration of a PC card so long as functions similar to those described above can be realized.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit card comprising:

a circuit capable of operating in at least two modes;

an interface for coupling said circuit card to an external device, said external device requiring said circuit to operate in one of said at least two modes and including a card slot for receiving said interface; and a card slot sensing unit operable to detect which said one of said at least two modes of operation said external device requires as a function of a structural configuration of said card slot;

wherein said card slot sensing unit is operable to produce a mode signal indicating which of said at least two modes of operation said external device requires, said circuit automatically operating in said one mode in response to said mode signal;

said circuit card includes a digital circuit capable of operating in at least an n-bit mode of operation and an m-bit mode of operation;

said card slot of said external device includes a surface sized and shaped to identify which of said n-bit and m-bit modes are required; and said card slot sensing unit is operable to detect which said n-bit and m-bit modes of operation said external device requires as a function of said surface of said card slot.

2. The circuit card of claim 1, wherein said n-bit and m-bit modes of operation are selected from the group consisting of 8-bit, 16-bit, 32-bit, and 64-bit.

3. The circuit card of claim 2, wherein said surface is sized and shaped pursuant to at least one of the Personal Computer Memory Card Interface Association and Japan Electronic Industry Development Association standards to identify which of said n-bit and m-bit modes are required.

4. The circuit card of claim 2, wherein said card slot sensing unit includes a movable member operable to respond to said size and shape of said surface of said card slot, said movable member causing said card slot sensing unit to produce said mode signal indicating which of said modes of operation said external device requires.

5. The circuit card of claim 4, wherein said card slot sensing unit includes a switching device in communication with said movable member such that said switching device changes state in response to said movable member, thereby causing said card slot sensing unit to produce said mode signal.

6. The circuit card of claim 5, wherein said switching device is a single pole switch element which causes said mode signal to exhibit either of first and second states, each state indicating which of two modes of operation said external device requires.

7. The circuit card of claim 4, wherein said card slot sensing unit includes a switching device having first and second contacts, said movable member including an arm which is cantilevered at one end and has an engagement portion at its distal end, said engagement portion including said first contact, said second contact being disposed adjacent to said first contact such that when said engagement portion communicates with said surface of said card slot, said first and second contacts either open or close in response to cantilever movement of said movable member, thereby producing said mode signal.

8. The circuit card of claim 4, wherein said card slot sensing unit includes a switching device and said movable member includes a slidable arm having a first engagement portion operable to communicate with said surface of said card slot and a second engagement portion operable to actuate said switching device, said slidable arm being biased such that said second engagement portion does not actuate said switching device when said interface is not received in said card slot, said second engagement portion either actuating or not actuating said switching device in response to said first engagement portion communicating with said surface, thereby producing said mode signal.

9. The circuit card of claim 1, wherein said n-bit and m-bit modes of operation require that the circuit receive first and second power supply voltage levels, respectively, from said external device, said circuit being operable to automatically adjust to said power supply voltage level in response to mode signal.

10. The circuit card of claim 9, wherein said n-bit mode is a 16 bit mode requiring said first power supply voltage level at about 5 volts and said m-bit mode is a 32 bit mode requiring said second power supply voltage level at about 3.3 volts.

* * * * *